Dec. 28, 1954 M. A. GOODBAR ET AL 2,698,139
MACHINE RELEASE MEANS KEY INTERLOCK
Filed Dec. 11, 1951 4 Sheets-Sheet 1

INVENTORS
MAYO A. GOODBAR
GEORGE A. COCUP &
KENNETH R. FAUX
BY
THEIR ATTORNEYS

Dec. 28, 1954   M. A. GOODBAR ET AL   2,698,139
MACHINE RELEASE MEANS KEY INTERLOCK
Filed Dec. 11, 1951   4 Sheets-Sheet 2

INVENTORS
MAYO A. GOODBAR
GEORGE A. COCUP &
KENNETH R. FAUX

BY

THEIR ATTORNEYS

Dec. 28, 1954  M. A. GOODBAR ET AL  2,698,139
MACHINE RELEASE MEANS KEY INTERLOCK
Filed Dec. 11, 1951  4 Sheets-Sheet 3
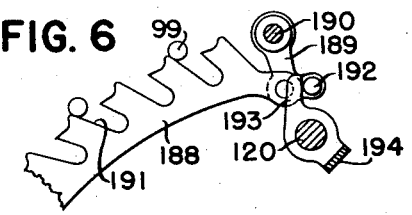
FIG. 6
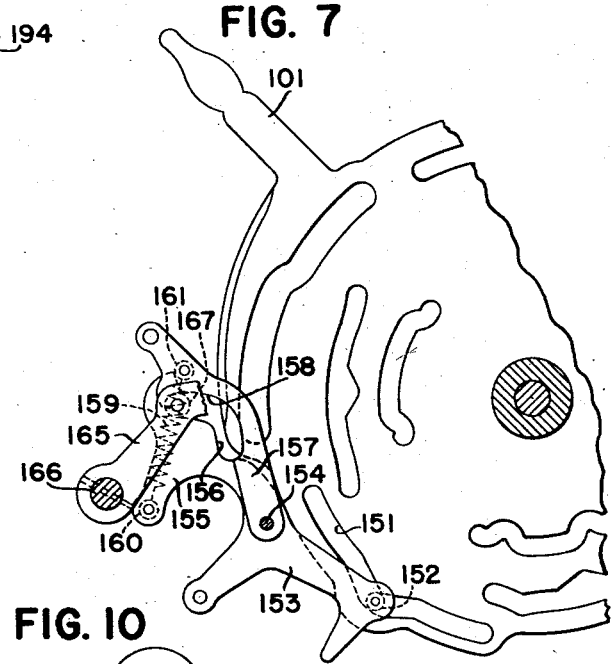
FIG. 7
FIG. 8
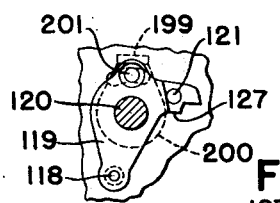
FIG. 9
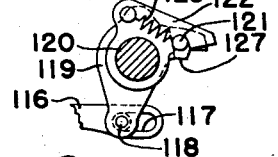
FIG. 10
FIG. 11
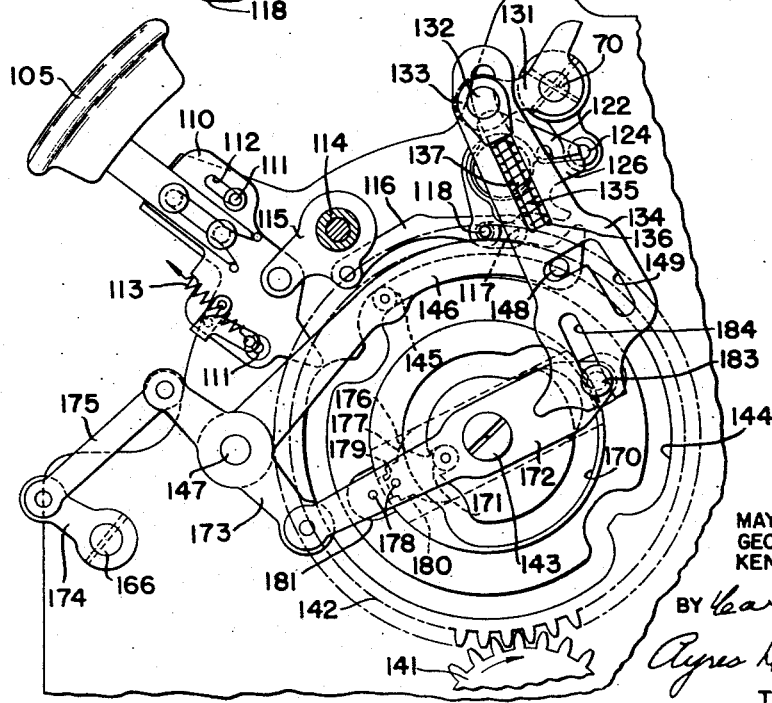
INVENTORS
MAYO A. GOODBAR
GEORGE A. COCUP &
KENNETH R. FAUX
BY Carl Beust
Ayres D. Stoddard
THEIR ATTORNEYS Dec. 28, 1954  M. A. GOODBAR ET AL  2,698,139
MACHINE RELEASE MEANS KEY INTERLOCK
Filed Dec. 11, 1951  4 Sheets-Sheet 4
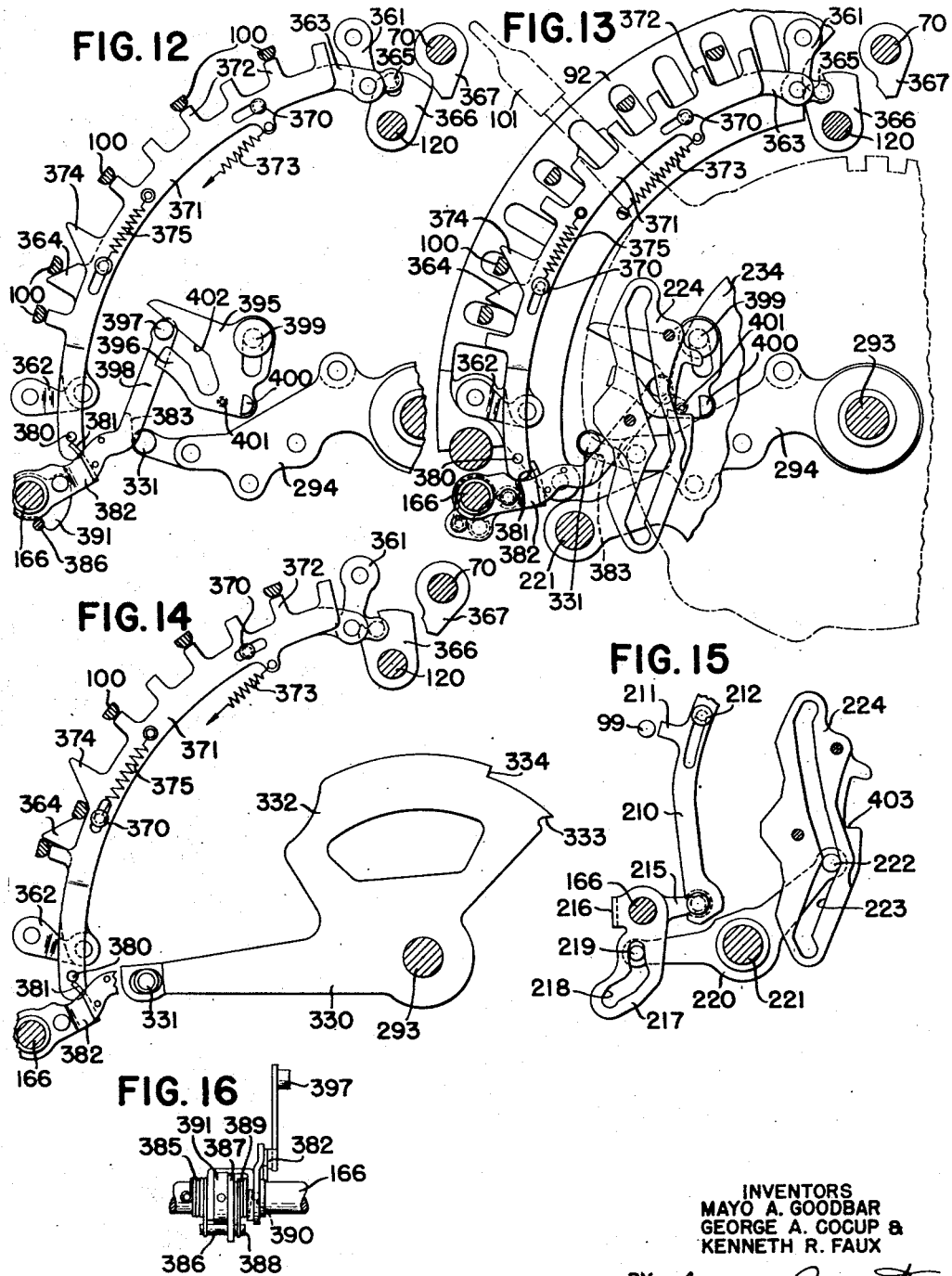
INVENTORS
MAYO A. GOODBAR
GEORGE A. COCUP &
KENNETH R. FAUX
BY
THEIR ATTORNEYS

United States Patent Office 2,698,139
Patented Dec. 28, 1954

2,698,139

MACHINE RELEASE MEANS KEY INTERLOCK

Mayo A. Goodbar, Oakwood, and George A. Cocup and Kenneth R. Faux, Dayton, Ohio, assignors to The National Cash Register Company, Dayton, Ohio, a corporation of Maryland Application December 11, 1951, Serial No. 260,998

10 Claims. (Cl. 235—130)

This invention relates to cash registers and the like, of the type shown in Letters Patent of the United States No. 1,865,147, issued to Bernis M. Shipley on June 28 1932.

An object of this invention is to provide a machine of the above type with mechanism whereby the usual motor bar of such a machine is used as a "Grocery" key, to register amounts for the sale of groceries and at the same time release the machine for operation.

Another object is the provision of means to control the sequences of operation of the machine.

Another object is the provision of a complete motorized bank of transaction keys for a machine of the type mentioned above.

A further object is the provision of mechanism wherein operation of the motor bar causes selection of a "Grocery" totalizer.

A still further object is the provision of novel controls for a machine of the type mentioned, whereby the operations of the machine are initiated by the depression of the "Paid Out" key.

A further object is the provision of special interlocks to prevent depression of the "Paid Out" key during the entry of a cash transaction.

A still further object of this invention is the provision of means to prevent the motor bar from tripping the machine release mechanism after a "Paid Out" entry has been made.

A still further object is the provision of mechanism to compel the operator to make a total-taking operation after a "Paid Out" operation before any other type of cash operation can be made by the machine.

With these and incidental objects in view, the invention consists of certain novel features of construction and combinations of parts, a preferred form or embodiment of which is hereinafter described with reference to the drawings which accompany and form a part of this specification.

Of said drawings:

Fig. 6 shows a part of the transaction bank machine release bar.

Fig. 7 shows part of the total lever control mechanism.

Fig. 8 shows a part of the means for tripping the machine-releasing means.

Fig. 9 shows a part of the means for tripping the machine-releasing mechanism.

Fig. 10 shows the machine-releasing mechanism and cycle control means.

Fig. 11 shows a part of the tripping means for the machine-releasing means.

Fig. 12 shows the transaction control bars at the end of a "Paid Out" operation, whereby the machine-releasing mechanism is locked against movement.

Fig. 13 shows the key frame of the penny bank and illustrates the mounting of the control bars on this bank; the transaction key studs are shown in this view in section.

Fig. 14 shows the transaction control bars with the "Paid Out" key depressed.

Fig. 15 is a detail showing how the "No Sale" key is locked against depression and how it is released under control of the total lever.

Fig. 16 shows the spring actuated control device for the key lock out bar.

General description

Figure 1:
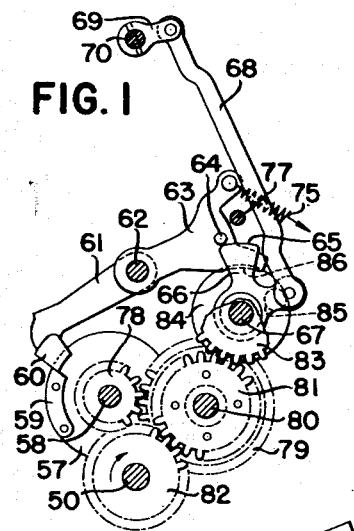
Fig. 1 shows a part of the motor drive and release mechanism, in reduced scale.

Described in general terms, the machine in its preferred form comprises a plurality of totalizers, one for each classification of transactions and one for totalizing the items of each separate transaction, the latter being known as an itemizing totalizer, which is cleared at the end of each multiple-item operation and each single-item operation.

In this particular type of machine, a total is taken after the several items of a multiple-item transaction have been entered. Also, when a transaction consists of a single item, the total is taken of that single item.

These totalizers are operated by a differential mechanism under the control of their manipulative means, which in this case are the usual amount keys.

The differential mechanism provides means for adjusting a printing mechanism, which is not shown in this case, to print, on issuing receipts, amounts which are entered in the totalizers.

In this particular case, all of the transaction keys are "motorized," as well as the regular motor bar.

In other words, the depression of any one of the transaction keys releases the machine for operation.

In the specific embodiment shown herein, the transaction keys are used for "Meat," "Produce," "Tax," "Paid Out," and "No Sale." These keys are all in the transaction bank.

The motor bar is used when entering amounts for "Groceries," and, therefore, the motor bar has inscribed thereon the term "Groceries."

There are three lines of totalizers, as is usual in this type of machine. The front totalizer line, shown in Fig. 3, has five totalizers thereon, one for meat, one for produce, one for tax, one for paid-out, and one for groceries, and the rear totalizer line has on it only one totalizer, which is a group totalizer of all of the cash transactions. The upper totalizer line carries one totalizer, which is an itemizing totalizer and is cleared at the completion of the entry of each transaction.

When the amount of the sale is set up, if it is for meat, the "Meat" key is pressed, the meat totalizer is selected, the item totalizer is selected, the group totalizer is selected, and the amount for the meat is added into all three of those totalizers. If the next item happens to be for groceries, the "Groceries" or motor bar is depressed, and the groceries total on the front transaction row of totalizers is selected upon operation of the Groceries key, or the motor bar.

Upon depression of this motor bar, the transaction differential goes to the 9 position and selects the Grocery totalizer, which is in the 9 position on this front row. After the several items of the transaction are entered, the total lever is moved to the Item Total position, and the motor bar is operated to release the machine for this particular operation.

At this time, the depression of the motor bar does not select, or cause the selection of, the totalizer in the ninth position on the front row.

One example of the entry of a complete transaction is as follows: For a 10-cent grocery item, set up, on the amount keys, 10 cents and press the Grocery motor bar. Then, for another grocery item of 75 cents, after setting up the amount of 75 cents, press the Grocery motor bar. These items, we will assume, are taxable items; therefore, in order to find out how much money is on the item totalizer for taxable purposes, the operator moves the total lever up one step from normal position and strikes the Grocery motor bar, which releases the machine for this operation, and the indicators show the amount of the two grocery items, which in this particular case is 85 cents. Therefore, the operator then moves the total lever back to the add position, shown in Fig. 1, and sets up three cents and presses the Tax key. Now, assume that there are other, non-taxable, items;

for example, a 10-cent grocery item, the amount of which is registered upon depression of the Grocery motor bar, which releases the machine and selects the Grocery totalizer. $1.10 worth of meat is entered by depression of the proper amount keys and the Meat key, and then 50 cents' worth of produce is entered by depression of the proper amount keys and the Produce key. After these non-taxable items are all entered, the total lever is moved to the first position below add, which is the item total position, and then the Grocery motor bar is again pressed to release the machine, the operation of which shows a total of $2.58. This amount was put into the item totalizer, which is on the top line, and for this particular operation this totalizer is cleared. However, all of these amounts have been entered into a group totalizer, and each of the individual amounts have been added to their associated individual totals. In other words, the grocery amounts have been entered into the Grocery totalizer, the tax into the Tax totalizer, the meat into the Meat totalizer, and the produce into the Produce totalizer, and all of the items, including the tax, have been entered into the group totalizer.

Should a paid-out operation be necessary, the operator sets up the proper amount on the amount keys and then presses the Paid-Out key. Now, the depression of this key locks out the meat, produce and tax keys until after the total lever has been moved to the item total position to take an item total of the amount which has been paid out, whether it included one or more operations; that is, whether one item or more than one was paid out. The taking of the total of the paid out totalizer is necessary in order to unlock the meat, produce and tax keys.

To register a No-Sale operation, the operator must first move the total lever down into the item total position and then press the No-Sale key in order to release the machine.

*Operating mechanism*

The machine shown herein is adapted to be operated by an electric motor of the well-known type illustrated and described in Letters Patent of the United States No. 1,144,418, granted to Charles F. Kettering and William A. Chryst on June 29, 1915. For a detailed description of the same, reference may be had to that patent.

Only a part of the motor clutch mechanism is shown in the accompanying drawings, and for a more detailed description of the clutch mechanism reference may be had to the above-mentioned Kettering and Chryst patent and also to United States Patent No. 1,817,883, issued to Bernis M. Shipley on August 4, 1931.

The motor is mounted on the left side frame of the machine, and the clutch mechanism between the motor and the machine includes a spring-actuated disk 57 (Fig. 1), mounted on a stud 58. This disk 57 carries a block 59, which normally contacts the forward end 60 of an arm 61 pivoted on a stud 62 on the frame of the machine. An arm 63, secured to the arm 61, carries a pin 64, which normally rests on a curved edge 65 of an arm 66 pivoted on a printer drive shaft 67 journaled in the printer frame.

The arm 66 is connected by a link 68 to an arm 69 secured to a shaft 70 extending across the entire machine and known herein as the machine release shaft.

When the arm 69 is rocked clockwise (Fig. 1) to release the machine, as will be described hereinafter, the arm 66 is rocked clockwise from beneath the pin 64, permitting a spring 75, attached to the arm 63 and to a pin (not shown) projecting from the machine side frame, to move the end 60 away from the block 59 on the spring-actuated disk 57, which is a part of the motor clutch mechanism. The clockwise movement of the lever 63 is limited by a pin 77 carried by the machine frame.

Upon release of the arm 61 from the block 59, the disk 57 is moved clockwise by a spring (not shown), causing an effective connection between the motor and the driving clutch to operate the machine, as fully illustrated and described in the above-mentioned Kettering and Chryst patent.

A main drive shaft 50 is driven from a gear 78 (Fig. 1), secured to the driving clutch. Said gear 78 meshes with an intermediate gear 79, freely mounted on a stud 80, supported in the side frame of the machine. Pinned to the gear 79 is a gear 81, which meshes with a gear 82, secured to the main drive shaft 50. The gear 81 also meshes with a gear 83, secured to the printer drive shaft 67. The main drive shaft 50 and the printer drive shaft 67 make a complete rotation during an adding operation of the machine.

The arm 61 is restored to locking position at the end of the operation of the machine by means of a disk 84 pinned to the shaft 67. This disk 84 carries a pin 85, which engages a curved edge 86 of the arm 63 to restore the arm 61 to stop the machine. This permits return of the arm 66, and consequently the shaft 70, to their home positions.

*Keyboard*

The keybord mechanism of the present invention, illustrated in this machine, is similar to that shown and described in the above-mentioned Shipley patents. The keyboard comprises, usually, four blanks of amount keys (only two banks being shown), a bank of clerk's keys (not shown herein), and a bank of transaction keys. In this present invention, the transaction keys are all motorized; that is, in adding operations upon depression of any of the keys in this bank, with the exception of the No-Sale key which cannot be depressed until the total lever is moved out of adding position as previously stated, the machine is released for operation. There are also provided a total lever and what in the past has been called the motor bar, which is also a bar or key to release the machine for operation.

Figure 2:
Fig. 2 is a diagrammatic view of a part of the keyboard of the machine.
Figure 3:
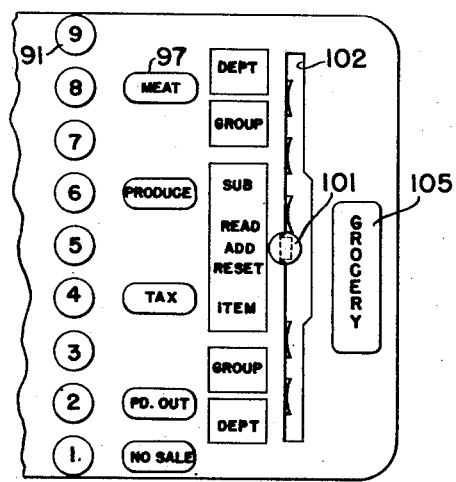
Fig. 3 is a section taken alongside one of the banks of amount keys and its associated differential mechanism.
Figure 3:
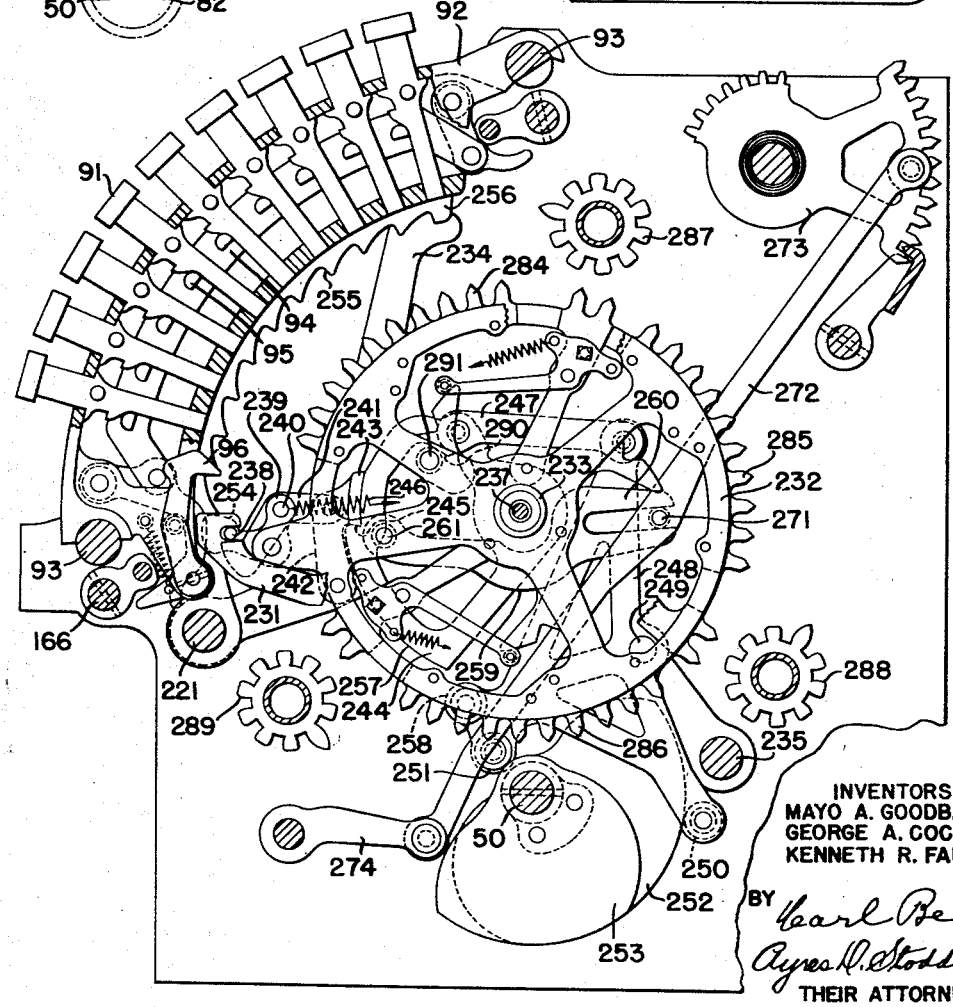

In Figs. 2 and 3 are shown two banks of amount keys 91. The keys 91 in Fig. 2 are the penny bank of keys, and the bank of amount keys 91 shown in Fig. 3 relates to one of the higher order banks above the penny bank. All of the amount keys 91 are identical. The keys 91 of each amount bank are mounted in an individual frame 92, mounted on cross rods 93 carried by the machine framework. The keys are retained in their normal outer positions by the usual compression spring (not shown herein).

When a key 91 is depressed, it cooperates with a detent 94, by which it is retained in its depressed position through the medium of studs 95 on this detent 94, as is well known in the art.

Each amount bank is provided with a zero stop pawl 96, pivoted to the frame of the bank and adapted to be rocked into ineffective position upon movement of the detent 94 upon depression of any of the keys 91 in the bank.

The transaction key bank (Figs. 1 and 4) includes keys 97, designated "Meat," "Produce," "Tax," "Paid Out," and "No Sale." These transaction keys 97 are carried by a key frame 98, supported on the previously-mentioned rods 93, and are held in normal outer position by the usual springs 102, which springs also restore the depressed keys to normal at each operation. Each of the transaction keys 97 is provided with a pin 99, which cooperates with a releasing bar and a locking detent, to be described hereinafter in connection with the machine-releasing mechanism.

Each of the keys 97 is also provided with another pin, 100, which is flattened on the top and extends from the opposite side of the key stem from which the pin 99 extends. These pins 100 are shown particularly in Figs. 12, 13, and 14 and are for the purpose of controlling and operating certain types of control bars, which will be described hereinafter in connection with the machine-releasing mechanism and the interlocks between the several keys.

To the right of the transaction keys is the usual total lever 101 (Figs. 2, 7, and 13), adapted to be moved up or down in a slot 102 in the machine cabinet. To the right of the total lever is what has been usually known in the past as the motor bar, and in this present application it carries a specific designation of "Groceries." This "Groceries" motor bar or key 105 is used, when depressed with the total lever 101 in the add position, not only to release the machine, but also to select a totalizer into which is accumulated the value of the groceries which are sold.

All of the transaction keys 97 are motorized; that is, the depression of any one of these keys, with the exception of the No-Sale key, which is at the bottom, will release the machine for operation without the necessity of depressing the motor bar 105. This makes for a much faster operation for stores using the checkout system, for which this particular invention is readily adapted.

The total lever 101 is used, as has been fully illustrated and described in the above-mentioned Shipley patent, for the purpose of controlling the machine for various types of operations, such as add, sub-total, and total operations.

This particular machine, to which the present invention is applied, is what is known as an itemizing totalizer machine, and each of the particular transactions, whether it be a single-item transaction or a multiple-item transaction, is totalized at the completion of that transaction by moving the total lever 101 down one step from its add position in which it is shown in Fig. 2, and then depressing the motor bar 105 to release the machine to make a total-taking operation.

Machine release mechanism

As has been mentioned above, the machine is released upon the operation of the "Meat" key, the "Produce" key, the "Tax" key, and the "Paid-Out" key, and it is also released upon depression of the "Groceries" bar 105.

To release the machine upon depression of the "No-Sale" key, it is necessary first to move the total lever 101 down into the item total position.

The means whereby the depression of any of the above-mentioned transaction keys 97 and the Grocery bar 105 releases the machine for operation will be described in detail.

In order to release the machine, it is necessary that the shaft 70 (Fig. 10) be released, so that it can be rocked clockwise by means to be described hereinafter, in order to free the clutch arm 61 (Fig. 1) to release the motor clutch, whereby the motor may drive the machine in the manner previously described.

The means whereby the depression of the motor bar or "Groceries" key 105 will release the machine for operation will be described first and with particular reference to Figs. 8 to 11. The "Groceries" bar 105 is detachably mounted upon a slide 110, which is supported by two studs 111, projecting into slots 112 in the slide 110. These studs 111 are mounted in the right side frame of the machine. The "Groceries" bar 105 is maintained in its normal outer position by a spring 113. The slide 110 is connected to an arm 115 pivoted on a bearing 114. Pivoted to the arm 115 is a link 116, having a slot 117 surrounding a pin 118 on a bell crank 119 pivoted on shaft 120 supported by the machine side frames. This arm 119 carries a stud 121 (Figs. 8, 9, and 11), which rests in a notch in a trip pawl 122. A spring 123 holds the trip pawl 122 in engagement with the pin 121.

When the trip pawl 122 is so held in contact with the pin 121, the right hand end of the trip pawl 122 lies directly in front of a flattened stud 124 on an arm 125 secured to the machine release shaft 70.

From the above-described train of mechanism, it can be clearly seen that, upon depression of the "Groceries" bar 105, through the arm 115, the link 116, and the arm 119, the pin 121 raises the trip pawl 122 counter-clockwise and removes the front end of the trip pawl away from the flattened stud 124. When this occurs, the pin 124 moves beneath the right end of the trip pawl 122, thus permitting the spring 135 to operate the machine release shaft 70, and the spring 113 immediately restores the bar 105 to its normal position.

Near the end of the operation of the machine, the shaft 70 moves back to and past its home position. Consequently, the pin 124 moves out from under the trip pawl 122 and past the end of a non-repeat pawl 126. The non-repeat pawl 126 is provided to prevent repeat operations if the "Groceries" key 105 should be held depressed during the entire operation of the machine. This non-repeat pawl 126 is normally held against a shoulder 127 on the arm 119 by a spring 128, but, when the bar 105 is depressed, the arm 119 and the shoulder 127 are elevated out of contact with the non-repeat pawl 126, and the pin 124 prevents the pawl 126 from following the arm 119.

If the "Groceries" motor bar 105 is held depressed during the entire operation of the machine, thus holding the arm 119 elevated, then, near the end of the operation of the machine, when the shaft 70, the arm 125, and the pin 124 are moved back past their home positions and past the end of the non-repeat pawl 126, the spring 128 will rock the non-repeat pawl 126 upwardly until it contacts the elevated arm 119, thus locking the machine against another operation. In this position, the end of the non-repeat pawl 126 is in the path of the pin 124, and consequently the machine cannot be released, even though the "Groceries" motor bar 105 is held depressed, and the arm 119 remains elevated. When pressure is removed from the bar 105, the spring 113 restores the bar 105 to normal position, and the non-repeat pawl 126 is returned to normal position by the arm 119 through its shoulder 127 by the spring 123 upon movement counter-clockwise of the machine release shaft 70 by the usual and well known hand release lever (not shown herein) but which is shown and described in the United States Patent No. 1,839,371, issued to Samuel Brand, on January 5, 1932.

When the trip pawl 122 is moved counter-clockwise (Figs. 9 and 11) to move its right end from in front of the flat stud 124 of the arm 125, the shaft 70 is rocked clockwise by the following means.

Secured to the shaft 70 on the outside of the right side frame of the machine, as shown in Fig. 10, is an arm 131, carrying a stud 132, supporting two spring-retaining pilots 133 placed on opposite sides of a link 134, which is slotted to move over the stud 132. Only one of the retaining pilots 133 is shown. A coil spring 135, surrounding the lower ends of these pilots 133, is compressed between the shoulders on said pilots and the end wall of a slot 136 in the link 134. The spring 135 is guided by a finger 137, which projects upwardly in the slot in the link 134.

From the above description it can be seen that, as the "Groceries" bar 105 is depressed and the trip pawl 122 is moved counter-clockwise in the manner previously described, the spring 135 is released to rock the shaft 70 clockwise to release the motor clutch mechanism previously described.

The mechanism for rocking the machine release shaft 70 counter-clockwise from its released position back to its normal position will now be described. Secured to the main cam shaft 50 of the machine is a gear 141 (Fig. 10), which meshes with a large gear 142 pivoted on the stud 143 carried by the right side frame of the machine. This gear 142 has a cam race 144, into which projects a roller 145 carried by an arm 146 pivoted on a stud 147, also carried by the machine side frame. This arm 146 also carries a pin 148, projecting into the horizontal portion of a bayonet slot 149 in the previously-described link 134.

It will be remembered that, when the machine is released, the shaft 70 is rocked clockwise by the spring 135, and the stud 132 is moved into the upper part of the slot 136 of the link 134. The cam race 144, through the roller 145, rocks the arm 146 first clockwise and then counter-clockwise to normal position. During the clockwise movement of the arm 146, the pin 148 moves the link 134 down and consequently rocks the arm 131 and the shaft 70 counter-clockwise slightly past its normal position, and then causes it to be set slightly clockwise into its normal position, shown in Fig. 10.

It might be well to state here that the gear 142 receives only one half rotation for each full rotation of the gear 141; consequently there are two camming portions of the slot 144, as shown in Fig. 10, the reason for this being that during sub-total and total operations, as has been fully illustrated and described in the previously-mentioned Shipley patent, this gear receives a full rotation, which gives two complete rotations to the shaft 50.

It might also be well to state here that, when the machine is operated by a handle, the handle is mounted on the hub 114, and a pinion (not shown), driven by the handle, meshes with the gear 142 to directly turn the gear by means of the hand-operated handle, which also is not shown in this case.

Total lever

A total lever 101 is provided, as is usual in machines of this type, for controlling the machine for total and sub-total operations. The total lever 101 in Fig. 7 is shown in its normal adding position. This lever has a cam slot 151, into which projects a roller 152 carried by a lever 153 pivoted at 154. The opposite arm 155 of the lever 153 has formed on one edge thereof a cam recess 156. A link 157, also pivoted at 154 and overlying the arm 155, has a complementary cam recess 158 formed in its edge, which cam recess cooperates with the cam recess 156, formed in the arm 155 of the lever 153, to constitute a cam slot. A spring 159, connected to a stud 160 on the arm 155, is also connected to a stud 161, carried by the link 157, to hold these parts together, with the stud 161 in contact with the upper end of the arm 155. This arrangement provides a flexible cam mechanism which will yield to prevent injury to the machine in case any of the parts are locked at the time the total lever 101 is shifted from its add position. A crank 165, fast on a shaft 166, carries a roller 167 entered in the cam slot formed by the complementary edges 156 and 158 of the lever 155 and the link 157.

When the total lever 101 is adjusted from its add position into its item total position, its cam slot 151 rocks the lever 153 counter-clockwise, and the arm 155, together with the link 157, rocks the crank 165 and the shaft 166 clockwise.

The initial movement of the total lever 101, as is well known in machines of the type shown and described herein, causes a coupling together of a cam, to be described, with the previously-described gear 142, so as to control the restoration of the machine release shaft 70 to its normal position during total and sub-total operations. This mechanism will now be described. Mounted on the previously-described screw stud 143 (Fig. 10) and lying in a recess in the gear 142 is a cam 170, which cooperates with a roller 171 carried by a pitman 172, the lower end of which is pivotally connected to a lever 173 pivoted on the stud 147. The left-hand end of the lever 173 is connected by a link 175 to an arm 174, which is fast on the previously-described shaft 166, which, it will be remembered, is moved by movement of the total lever out of its add position. The cam 170 is freely mounted on the stud 143 and is normally retained in an inoperative position by the roller 171 being in a notch 176 formed in the cam 170. The initial clockwise movement of the shaft 166, through the connections described above, causes the roller 171 to be withdrawn from the notch 176, and, at the same time, a coupling bar 177, which rides in a slot in the back of the cam 170, is moved to the left, as viewed in Fig. 10, by pins 178 on the pitman 172. These pins are on each side of a lip 179 on the coupling bar 177. This movement of the pitman 172 to the left is sufficient to move the narrow end 180 of the coupling slide 177 into a recess 181 in the gear 142, so as to couple the cam 170 to the gear 142, whereby the cam 170 will receive a rotation upon rotation of the gear 142. The shifting of the pitman 172 by the cam 170 will, through a stud 183, which projects into a slot 184 in the previously-described link 134, rock the link 134 clockwise to position the vertical part of the slot 149 beneath the pin 148 in the restoring arm 146, so that the release shaft 70 will not be returned to its normal position until the second cycle of the operation, all of which is old and well known in the art, as fully illustrated and described in the above-mentioned Shipley Patent No. 1,865,147.

Associated with the transaction keys 97 is a release bar 188 (Fig. 6) pivoted to an arm 189, which in turn is pivoted on a stud 190 on the transaction key frame 98. This release bar 188 is provided with the usual slots 191, which cooperate with the pins 99 on the transaction keys 97, which are designated "Meat," "Produce," "Tax," "Paid Out," and "No Sale."

The arm 189 also carries a stud 192, normally in contact with an arm 193, which is pivoted on the shaft 120. This arm 193 is connected by a bail 194 to an arm 195 (see also Figs. 4, 5, and 6). The arm 193 is normally held in contact with the pin 192 by a spring 196, shown in Fig. 4. This arm 195, which is also pivoted on the shaft 120, is connected by a pin 197 to an arm 198, also pivoted on the shaft 120. Integral with the arm 198 is a bail 199, which is also integral with an arm 200, pivoted on the shaft 120. The previously-described arm 119 has a pin 201, which projects into the arm 200.

From the above description it will be clear that the depression of any one of the transaction keys 97, through its pin 99, moves the release bar 188 to the left, as viewed in Fig. 6, whereupon the pin 192, through the arm 193, the bail 194, the arm 195, the arm 198, the bail 199, and the arm 200, rocks the previously-described arm 119 counter-clockwise, as viewed in Figs. 8, 9, and 11, whereupon its pin 121 rocks the trip pawl 122 counter-clockwise away from the pin 124 on the arm 125 of the release shaft 70, and, when this occurs, the release shaft 70 is rocked clockwise in the manner previously described, to connect the motor clutch mechanism, shown in Fig. 1, to cause the machine to be driven through its proper number of cycles. The above-described movement of the arm 119 is independent of the "Groceries" motor bar 105, such movement being permitted by the slot 117 (Figs. 9 and 10) in the link 116.

Figure 4:
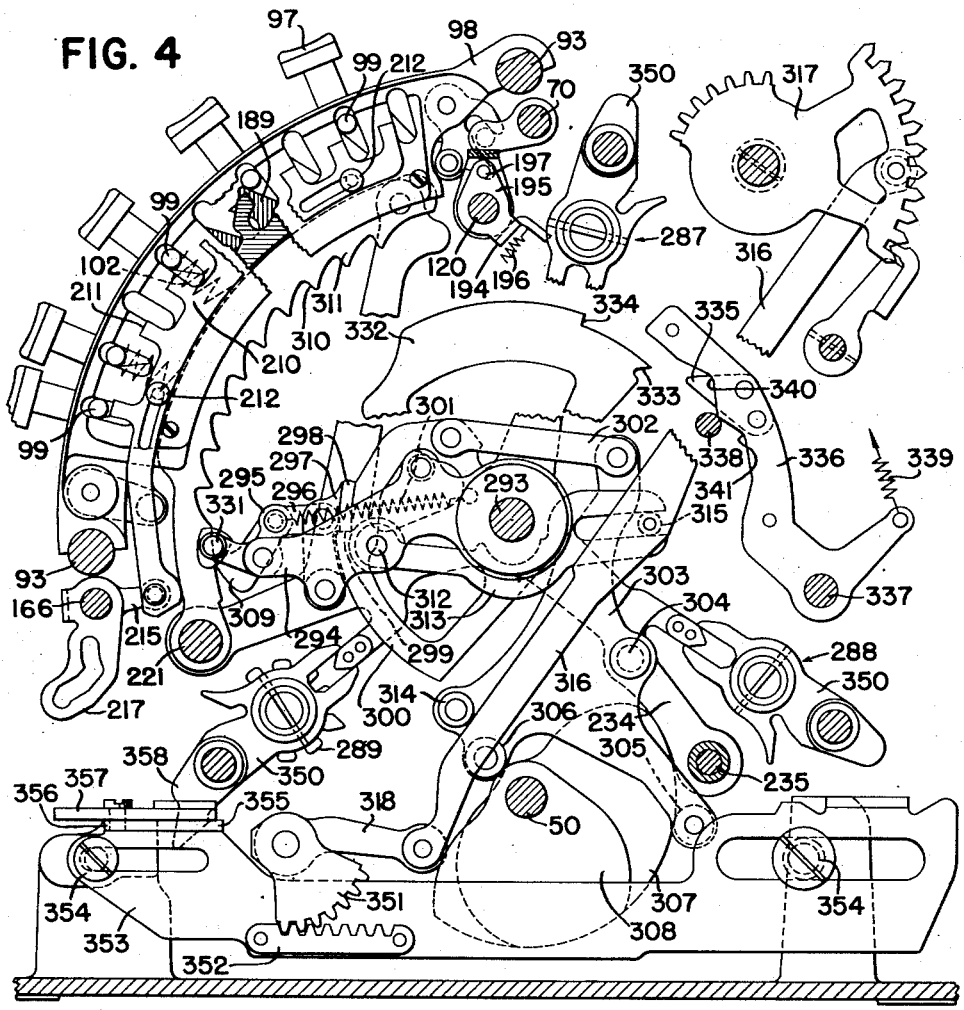
Fig. 4 is a view of the transaction bank of keys and its associated differential mechanism.
Figure 5:
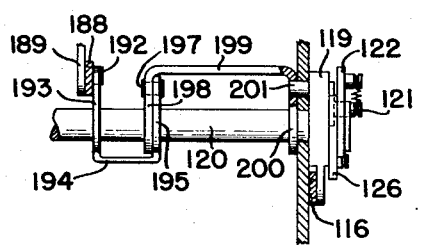
Fig. 5 is an end view showing part of the machine release control means.

Also associated with the transaction keys 97 is an interlocking detent 210 (Fig. 4), having interlocking fingers 211. This detent is slidably mounted on pins 212, carried by the transaction key bank 98. Normally, as shown in Fig. 4, one of the interlocking fingers 211 is directly beneath the pin 99 on the No Sale key and free from all of the other pins on the Meat, Produce and Tax keys in this bank, and therefore the No Sale key 99 cannot be depressed when this detent 210 is in its normal position, as shown in Figs. 4 and 15.

In order to remove this finger 211 from beneath the pin 99 of the No Sale key, it is necessary to move the total lever 101 out of its add position.

The detent 210 is pivoted to an arm 215, pivoted on the shaft 166. A bail 216 connects the arm 215 to a cam arm 217, having a cam slot 218, into which projects a pin 219 on a lever 220, mounted on a machine tie rod 221. The lever 220 also carries a roller 222, projecting into a cam slot 223 in a plate 224, which is secured to the total lever 101. When the total lever 101 is moved in either direction out of add position, the lever 220 is rocked counter-clockwise, thus rocking the arm 217 and the arm 215 counter-clockwise, whereupon the detent 210 is raised, thus removing the interlocking finger 211 from beneath the pin 99 of the No Sale key and at the same time moving all the other interlocking fingers 211 associated with the "Tax" key, the "Produce" key, and the "Meat" key directly beneath the pins 99 on those keys, so that those keys cannot be depressed while the No Sale key is being depressed.

There are other interlocking devices and mechanisms in connection with the transaction keys 97, which will be hereinafter explained.

*Amount differential mechanism*

The amount differential mechanism shown in this case in connection with one single amount bank is substantially identical with the amount differential mechanism shown in the above-mentioned Patent No. 1,865,147, and therefore only a brief description thereof will be given herein.

Depression of any one of the amount keys 91 (Fig. 3) rocks the zero stop pawl 96 associated with that particular denomination counter-clockwise out of the path of a reset spider 231, free on a hub of an amount differential actuator 232, rotatably supported on a bushing 233, extending between two hangers or support plates 234 (only one of which is shown here), said plates being in turn supported by the rod 221 and a rod 235, extending between the main frames of the machine. There is a pair of supporting plates 234 for each amount differential, and a tie rod 237 extends through the holes in the centers of the bushings 233 to secure all of the amount differentials in a compact unit.

A notch in the forward end of the reset spider 231 engages a stud 238 in a forward extension of the bell crank 239, pivoted on an extension of the actuator 232. Carried by the vertical arm of the bell crank 239 is a stud 240, on which is pivoted an arm 241. This arm 241 is also pivoted to the upper end of the latch 242, pivotally mounted on the actuator 232. The latch 242 has a foot 243, normally held in contact with the periphery of a driving segment 244, just above the shoulder 245 thereon, by means of a spring 246. The driving segment 244 is rotatably supported on the hub of the actuator 232. A link 247 pivotally connects the driving segment 244 to a cam lever 248 pivoted on a stud 249 in the left-hand one of the plates 234, said lever 248 carrying rollers 250 and 251, which coact with the peripheries of cams 252 and 253, respectively, secured on the main cam shaft 50. Depression of any one of the amount keys 91 moves its lower end into the path of a rounded surface 254 of the bell crank 239.

In one-cycle, or adding, operations, the main cam shaft 50 and the cams 252 and 253 make one clockwise rotation, causing the lever 248 to rock the driving segment 244 first clockwise and then counter-clockwise back to normal position. Clockwise movement of the segment 244 causes the shoulder 245 thereon, in cooperation with the foot 243 of the latch 242, to carry the latter and the amount actuator 232 clockwise in unison until the rounded surface 254 contacts the stem of the depressed key 91. This causes a counter-clockwise rocking of the bell crank 239, which, through the arm 241, disengages the foot 243 of the latch 242 from the shoulder 245 to arrest the clockwise movement of the actuator 232 to position said actuator according to the value of the amount key depressed. This disengagement of the latch 242 moves the forward extension of the arm 241 into engagement with one of a series of locating notches 255 in a plate 256, which is mounted on the rod 221 and an upper extension of the left-hand supporting plate 234.

As the latch 242 is disengaged from the shoulder 245, an arcuate surface 257 on the segment 244 moves opposite the foot 243 to retain the latch in its set position.

When the lever 248 reaches the terminus of its clockwise movement, a roller 258, carried thereby, contacts an arcuate surface 259 on a beam 260 pivoted on a stud 261, carried by the actuator 232, and forces a concave surface on the upper edge of the beam 260 into contact with the hub of the actuator 232, to move the rear end of the beam into a position commensurate with the value of the depressed amount key 91.

The rear end of the beam 260 is bifurcated to receive a stud 271 on a link 272, the upper end of which is pivoted to a segment 273, which is a part of an indicating mechanism not shown herein but clearly illustrated and described in the United States patent issued to Bernis M. Shipley, No. 1,817,883, on August 4, 1931.

The lower end of the link 272 is connected to an arm 274, which is used to set up and control a printing mechanism, as fully illustrated and described in the above-mentioned Shipley Patent No. 1,865,147.

From the above description it is very clear how the differential actuator 232 is set under control of the depressed one of the amount keys 91.

Each of the actuators 232 carries three sets of gear teeth, 284, 285, and 286, which cooperate with lines of totalizers 287, 288, and 289, respectively, to cause the value of the amount key depressed to be accumulated into the selected one or more of the totalizers on the totalizer lines 287, 288, and 289, in a manner which is old and well known in the art and which is also fully illustrated and described in the above-mentioned patents.

The actuator 232 is restored, from its differentially set position, each operation by a shoulder 290, on the driving segment 244, contacting a stud 291, carried by the actuator 232, when the segment 244 is moved to its home position.

*Transaction differential*

Associated with the transaction keys 97 (Fig. 4) is a differential mechanism including a differential arm 294 pivoted at 293 and carrying a bell crank 295, to the upper arm of which is pivoted an arm 296, which is also pivoted to a latch 297, pivoted on the differential arm 294. The latch 297 has a foot 298, normally resting above a shoulder 299 on a driver 300. A spring 301 holds the latch foot normally in engagement with the driver 300. The driver receives a clockwise movement and then a counter-clockwise movement to normal position by means of a link 302 connected to and driven by a lever 303 pivoted at 304 to one of the differential hangers 234. The lever 303 carries a pair of rollers 305 and 306, cooperating with and driven by a pair of plate cams 307 and 308, respectively. As the driver 300 is moved clockwise, the differential arm, through the latch 297, is carried upwardly until the forward end 309 of the bell crank 295 strikes the inner end of one of the depressed transaction keys 97, at which time the continued movement of the driver 300 causes the latch 297 to be withdrawn from above the shoulder 299, whereupon the forward end 309 of the arm 296 engages the appropriate one of a series of notches 310 in a stationary plate 311 associated with the transaction bank of keys. Pivoted at 312 on the differential arm 294 is the usual beam 313, which is contacted by a roller 314, on the driving lever 303, to position the free end of the beam in accordance with the differential setting of the arm 294. This beam 313 is slotted as usual to engage a stud 315 of a link 316, the upper end of which is connected to a segment 317 to set the proper indicator according to the key depressed. The lower end of the link 316 is connected to an arm 318, which is connected to the printing mechanism to set the printer type wheel according to the key depressed.

The beam 313, the link 316, and the arm 318 also, by means to be described hereinafter, operate a totalizer-shifting mechanism to select the proper one of a group of totalizers on the front totalizer line according to the keys which are depressed.

In other words, each of the transaction keys 297, designated "Meat," "Produce," "Tax," and "Paid Out," selects a totalizer 289 on the front line of totalizers, to have accumulated therein the amount corresponding to the amount keys which are depressed in connection with the transaction key 97.

There is also another totalizer 289 on this front line, into which are accumulated all of the amounts relating to groceries, and this totalizer is selected whenever the "Groceries" motor bar 105 is depressed during an adding operation.

The means for causing the selection of this particular totalizer 289 in the front line, under control of the "Groceries" motor bar 105, will now be described.

Since there is no zero stop mechanism in connection with the transaction keys 97, whenever the "Groceries" motor bar 105 is depressed in an adding operation to release the machine, the transaction differential mechanism shown in Fig. 4 goes to the limit of its upward movement, which is the "9" position, thus causing the beam 314 to move the link 316 and the arm 318 a corresponding distance, which is sufficient to select the totalizer 289 in the "9" position, this being the "Groceries" totalizer.

Pivoted on the center 293 (Figs. 4 and 14) is an arm 330, which has a slot in its outer end engaging a pin 331, carried by the previously-described bell crank 295, which, it will be recalled, is carried by the differential arm 294 and is connected to the differential latch 297 by a link 296. Integral with the arm 330 is a segmental arm 332, having shoulders 333 and 334 adapted to cooperate with a finger 335 carried by an arm 336 pivoted at 337 and normally held in contact with a pin 338 on the total lever 101 by a spring 339. As shown in Fig. 4, the pin 338 is in a position wherein the total lever 101 is in its adding position.

Since the arm 330 is connected to the differential arm 294, through the stud 331, it is clear that whatever movement is imparted to the differential arm 294, under control of the keys 97, is also imparted to the arm 330 and its integral segmental arm 332.

Whenever any of the keys 97 is depressed when the total lever 101 is in its normal add position, the arm 330 and the differential arm 294 are controlled or set differentially under control of the keys 97. However, whenever the total lever 101 is moved, for example, to the item total position, which is the first position below add, the pin 338 of the total lever is moved opposite a notch 340 (Fig. 4) of the arm 336, whereupon the spring 339 rocks the arm 336 counter-clockwise and positions the finger 335 in the path of the shoulder 334 on the segmental arm 332, thus stopping this arm 332, and consequently the arm 330, in the third differential position. Of course, the stopping of the arm 332 in connection with the stud 331 causes the disengagement of the latch 297 from the driver 300, and consequently the differential arm 294 is stopped in the third position, thus positioning the beam 313 and the link 316 in the third position. Therefore, the indicating mechanism and the printing mechanism are properly set to indicate that an item total was made at this time.

Whenever the total lever is moved into the first position above add, which is the sub-total position, then the pin 338 on the total lever is opposite the notch 341 of the arm 336, and the spring 339 then moves the arm or finger 335 into a position opposite the notch 333. When this occurs, the arm 332, and consequently the arm 330 and the differential arm 294, are stopped in zero position, whereupon the beam 313 and the link 316 control the indicators and the printing mechanism to indicate that a sub-total was taken at this particular operation.

*Totalizer*

The lines of totalizers 287, 288, and 289 have been mentioned previously. The upper line carries the itemizer only, and the back line carries the group totalizer, into which are added all of the cash items on the machine. On the front line there are five totalizers, one associated with the "Paid Out" key, one with the "Tax" key, one with the "Produce" key, one with the "Meat" key, and one with the "Groceries" motor bar.

The totalizer associated with the "Groceries" motor bar 105 is in the "9" position on the front line of totalizers 289. These totalizers are all carried in frames 350, which are shiftable laterally to select totalizers under the control of the transaction keys 97 and the "Groceries" motor bar 105.

In the present machine, however, the top totalizer is not shifted, because it contains, as above mentioned, only the one itemizing totalizer. The back line of totalizers 288 is not shifted, because it contains only a group totalizer, into which are added all of the cash items. However, the group of totalizers 289 on the front totalizer is shifted under control of the transaction keys 97 and the "Groceries" motor bar 105.

The means for shifting this front line of totalizers is fully illustrated and described in the above-mentioned Shipley Patent No. 1,865,147, and therefore only a very brief description of the same will be given herein.

It will be recalled that the arm 318 (Fig. 4) is moved differentially by the link 316, which receives its movement from the differentially adjustable beam 313 under control of the transaction keys 97 and the "Groceries" motor bar 105. Connected to the arm 318 is a gear segment 351, meshing with the rack 352, secured to the side of a slide 353 mounted to ride on studs 354 carried by the machine base. The slide 353 has a flange 355, in which is a cam slot (not shown), which cooperates with a roller 356 carried by a lateral slide 357, which engages an arm 358 of the totalizer frame 350.

The differential positioning of the arm 318 under control of the transaction keys 97 and the "Groceries" motor bar 105 sets the slide 353 in a corresponding position, whereupon the cam race in the flange 355, through the transverse slide 357, moves the totalizer frame 350 laterally to select the totalizer according to the key 97 which has been depressed, or according to the "Groceries" motor bar 105, in adding operations.

From the above description it will be clear that the appropriate totalizer 289 of the front line is selected according to the key 97 which has been depressed, and is also positioned under control of the "Groceries" motor bar 105 when this bar is depressed for an adding operation.

*Machine release control mechanism*

In connection with the present invention, there is, associated with the transaction keys 97 and the total lever 101, mechanism to compel the operator to operate the machine in a certain manner, depending upon the type of operation which has been started.

For example, when a customer comes in the store and buys meat, the cost of the meat is set up on the amount keys, and the "Meat" key 97 is depressed. If the customer buys produce, the "Produce" key 97 is depressed, along with the amount of produce, and, if other groceries are purchased, the operator sets up the cost of groceries and depresses the "Groceries" motor bar 105. After these have seen set up in the machine, if there is no tax, the operator then moves the total lever 101 down one step into the item total position and depresses the "Groceries" motor bar 105, whereupon a total of the items, including the meat, the produce, and the groceries, is printed and the item totalizer cleared, and the machine is then ready for a subsequent operation.

After an operation of the kind just above described has been started, there is mechanism in the machine to prevent the depression, for example, of the "Paid Out" key at any time during the entry of the groceries, the meat, the produce, or even the tax, until after the item total has been taken of these by the movement of the total lever 101 to the item total position, followed by the depression of the motor bar 105.

On the other hand, should the operator be required to make a "Paid Out" operation, the operator sets up the amount paid out and then depresses the "Paid Out" key. Upon depression of the "Paid Out" key, all of the other keys 97—namely, the "Meat" key, the "Produce" key, and the "Tax" key—are locked against depression. The motor bar, while not being locked against depression, is locked against an effective depression in this manner, in that, even though it is depressed, it will not cause the machine to be released for operation after the depression of the "Paid Out" key. Therefore, after the registration of a "Paid Out" operation, it is necessary for the operator to move the total lever 101 down one step into the item total position and take an item total by depressing the "Paid Out" key. After this item total operation of the paid-out transaction, the machine is then again restored to its normal position, wherein another "Paid Out" operation may be registered, or an operation involving the purchase of meats, produce, groceries, etc., may be registered.

The mechanism for causing the above forced sequence of operation will now be described. Referring particularly to Figs. 12, 13, 14, and 16, there is pivoted to a pair of arms 361 and 362, carried by the penny key bank 92, a control bar 363, having a finger 364 adapted to be contacted by the pin 100, carried by the "Paid Out" key 97. The arm 361 carries a pin 365, engaging a slot in an arm 366, loosely pivoted on the shaft 120. This arm 366 is adapted to cooperate with an arm 367, which is secured to the machine release shaft 70.

In Fig. 13, these parts are shown in their normal positions, wherein the release shaft 70 may be rocked clockwise to release the machine in the manner previously described.

The release bar 363 carries two pins 370, upon which is slidably mounted a lockout bar 371, having fingers 372 adapted to cooperate with the pins 100 on the "Meat," "Produce," "Tax," and "No Sale" keys 97. A spring 373 holds the lockout bar 371 normally in the position shown (Fig. 13), wherein the fingers 372 do not block any movement of the transaction ("Meat," "Produce," "Tax," or "No Sale") keys. This lockout bar 371 also has a finger 374 adapted to cooperate with the pin 100 on the "Paid Out" key 97. Upon depression of the "Paid Out" key, as shown in Fig. 14, the lockout bar 371 is moved from the position shown in Fig. 13 to that shown in Fig. 14, whereby the fingers 372 lie beneath the "No Sale," "Tax," "Produce," and "Meat" keys 97, thus preventing depression of any of those keys while the "Paid Out" key is depressed.

As has been previously described, the "Paid Out" key, being what is known as a "motorized" key, has caused the release of the machine, whereupon the shaft 70 has been moved clockwise from the normal position, shown in Fig. 13, into the position shown in Fig. 14. At the end of the "Paid Out" operation—that is, after the "Paid Out" key has been restored to its normal position—the parts assume the position shown in Fig. 12, and, as the "Paid Out" key rises, a spring 375, stretched between a pin on the lockout bar 371 and the pin 370 on the control bar 363, causes the bar 363 to be moved to the right, or upwardly, from the position shown in Fig. 14 to that shown in Fig. 12, whereupon the pin 365 in the arm 361 moves the arm 366 from the position shown in Fig. 14 into the position shown in Fig. 12, wherein it is directly in front of the arm 367, which is fastened to the machine release shaft 70.

In this position of the arm 366, in Fig. 12—that is, at the end of a "Paid Out" operation—the machine release shaft 70 cannot be rocked clockwise, which is necessary to cause the machine to be released, which occurs upon the normal depression of the "Groceries" motor bar 105. Therefore, it can be seen that, after a "Paid Out" operation, the machine cannot be released by depression of the motor bar 105 because the shaft 70 is blocked for movement by the arm 366 in Fig. 12 being in the path of the arm 367 on the machine release shaft 70.

During this "Paid Out" operation, the lockout bar 371 is locked in the position shown in Fig. 12 by the following mechanism. This bar 371 has a pin 380, which is engaged by a flange 381 on an arm 382, pivoted on the previously-described shaft 166. Normally the flange 381 and the arm 382 are in the position shown in Fig. 13.

The arm 382 is normally held in the position shown in Fig. 13 by the pin 331, which, it will be remembered, is carried by the bell crank on the differential arm 294, associated with the transaction keys 97. This pin contacts the upper end 383 of the arm 382, as shown in Fig. 13. Just as soon as the machine is released and the arm 294 is moved clockwise, the arm 382 is moved from the position shown in Fig. 13 to the position shown in Fig. 12 by the following mechanism.

Wrapped around the shaft 166 is a torsion spring 385, having one end fastened to a pin in the shaft 166 and the other end wrapped around a pin 386 of an arm 387, which is loose on the shaft 166. This arm 387 carries another pin 388. This pin 388 has contacting it one end of a second torsion spring 389, the other end of which is wrapped around the pin 390 on the arm 382.

From the above it can be seen that, as soon as the stud 331 is moved away from the end 383 of the arm 382, the spring 385 is released and rocks the arm 387 counterclockwise, as viewed in Figs. 12 and 13, and it, through its pin 388, and the spring 389, rocks the arm 382 counterclockwise from the position shown in Fig. 13 into the position shown in Fig. 12, wherein the flange 381 is directly beneath the pin 380 on the lockout bar 371, thus preventing depression of any of the keys 97 so long as the arm 382 is in the position shown in Fig. 12.

Since this arm 382 cannot be restored back to its normal position, shown in Fig. 13, until an item-total operation has been performed, it is perfectly clear that, once an operation by the "Paid Out" key has been started, no other type of operation may be performed until after the operator takes an item total of the "Paid Out" operation, regardless of whether or not it be one or two "Paid Out" amounts which have been registered.

During the total operation, it will be recalled, as has been previously described in the early part of this case, when the total lever is moved into the item total position, it causes a short clockwise movement of the shaft 166 in order to couple the cam 170 with the driving gear 142. During the two cycles of the item total operation, which involves only one complete cycle of the cam 170, the shaft 166 is rocked further in a clockwise direction by this cam 170, as has been previously described. During this operation, a restoring arm 391 (Fig. 16), which is secured to the shaft 166, contacts the pin 386 and rocks the arm 387 clockwise to its normal position, and this movement of the arm 387, through its pin 388 and the spring 389, rocks the arm 382 clockwise to its home position, so that, when the differential arm 294 is restored counterclockwise into the position shown in Fig. 13, it will again contact the upper end 383 of the arm 382 and lock the arm 382 in the position shown in Fig. 13, thus releasing the flange 381 from the pin 380 on the bar 371.

Upon release of the bar 371, the spring 373 moves the bar 371 from the position shown in Figs. 12 and 14 to its normal position, shown in Fig. 13. At the same time, the bar 371, by its contact with the pin 370 in the control bar 363, moves said bar 363 back to its normal position (Fig. 13), whereupon the arm 366 is moved away from the arm 367, thus removing any blocking of the release shaft 70.

When one of the transaction keys—namely, the "Meat" key, the "Produce" key, or the "Tax" key—or the "Groceries" bar is depressed, upon the release of the arm 382 by the movement of the differential arm 294 clockwise, thus releasing its stud 331 from the end of the arm 382, the springs 385 and 389 rock the arm 382 counter-clockwise from the position shown in Fig. 13, upwardly, and this time, since the lockout bar 371 has not been moved by the "Paid Out" key, the flange 381 is moved above the pin 380 on the lockout bar 371, thus preventing any depression of the "Paid Out" key until after the item total of the items has been taken, at which time the arm 382 and the flange 381 are restored back to the position shown in Fig. 13. After a "Paid Out" operation, should the total lever 101 be moved upwardly into a sub-total position, this will not release the arm 382 or cause it to be restored to its normal position by movement of the shaft 166, because at this time, as the total lever 101 moves upwardly, it rocks an arm 395 clockwise from the position shown in Fig. 12, until an integral arm 396 is directly to the left of a pin 397 on an extended arm 398 of the arm 382. During this operation, when the shaft 166 is rocked clockwise by the cam 170, it merely tightens up the springs 389 and 385 and does not restore the arm 382 to its normal position. Therefore, even at the end of a sub-total operation, none of the "Meat," "Produce," and "Tax" keys 97 can be depressed. In other words, it is always, as has been previously stated, necessary to make an item total operation of a "Paid Out" transaction before any of the other keys 97 can be depressed. Should the motor bar 105 be depressed at this time it will not release the machine because the arm 366 is now in the path of movement of the arm 367 which is secured to the machine release shaft 70. This arm 366 was moved into this position shown in Fig. 12 during the last part of an operation wherein the paid out key was depressed to release the machine.

This lever or arm 395 is pivoted on the stud 399, carried by the hanger 234, and carries a stud 400, normally in the position shown in Fig. 13. The lever 395 hangs by gravity in the position shown in Fig. 13, and a pin 401 is normally resting in a notch in the hanger 234 to prevent the lever 395 from moving any farther in a counter-clockwise direction than shown in Fig. 13.

Whenever the arm 382 is moved counter-clockwise, as previously described, by its springs 385 and 389, the pin 397, operating in a slot 402 in the lever 395, rocks the lever slightly clockwise and brings the pin 400 so that it is just above a shoulder 403 on the plate 224, which is carried by the total lever 101. Therefore, when the total lever 101 is moved clockwise to a sub-total position, as described above, prior to the taking of an item total of a "Paid Out" operation, after a "Paid Out" operation has been started, the shoulder 403, by its contact with the pin 400, slides the arms 395 and 396 upwardly to position the arm 396 directly behind the pin 397 of the arm 398, so as to cause the continued locking of the keys ("Meat," "Produce" and "Tax") to force an item-entering operation of the "Paid Out" transaction.

When the arm 382 is restored to its normal position, shown in Fig. 13, by the restoring arm 391, in the manner previously described, by the cam 170, during an item total operation, the pin 397 again engages in the lower part of the slot 402, as shown in Fig. 13.

From the above description it can be clearly seen that, so long as the bar 371 is locked in the position shown in Fig. 12, it is impossible to make an operation other than an item total operation of the "Paid Out" transaction after a "Paid Out" operation has once been made, because, at the end of a "Paid Out" operation, before the item total of the paid-out transaction has been made, the arm 366 is in the position shown in Fig. 12; consequently depression of the "Groceries" motor bar 105 will not release the machine, because the arm 367 cannot be moved clockwise because of the position of the arm 366. Therefore, since the arm 366 blocks any movement of the arm 367, it blocks movement of the shaft 70; consequently, even through the trip pawl 122 should be moved out of the path of the pin 124 by depression of the motor bar 105, the machine still cannot be released until after the taking of an item total of the previously-made "Paid Out" operation.

Since all of the various movements of the mechanisms involved in this present invention have been described in connection with the detailed description of those parts, it is not felt necessary to go into any further description of the operation of the machine at this time except to say that, once an operation involving a "Paid Out" transaction has been started, it is absolutely necessary that the operator take an item total of that "Paid Out" transaction before any other type of transaction can be entered in the machine, and, on the other hand, should an operation involving the entry of items relating to meat, produce, groceries, etc., be started, it is necessary that the item total of that operation be taken subsequently, before any "Paid Out" operation can be entered into the machine.

When the total lever 101 is moved into the second position below add and the "Groceries" bar 105 is depressed, a total will be taken from the totalizer 288 on the back line, which, as above stated, is moved into engagement with the actuators each adding operation, so that a group total of all cash amounts is to be found upon this totalizer.

The front totalizer line has five totals, one total for the "meat" transactions, one of the "produce" transactions, one for the amount of tax, one for the amount paid out, and one for the amount of groceries.

When the total lever is moved into the lowest position below the add position, and these keys—namely, the "Meat" key, the "Produce" key, the "Tax" key, the "Paid Out" key, and the "Groceries" key—are depressed for separate operations, at that time the totals of these various totalizers can be taken, printed, and indicated in the manner described in the above-mentioned Shipley Patent No. 1,865,147.

The present invention involves a machine which is very useful in check-out stores. When "Groceries" are being registered, it is not necessary to depress any special key, only to depress the amount keys and then depress the motor bar, which automatically cause selection of the "Groceries" totalizer upon the depression of this motor bar.

Therefore, it can be seen that this "Groceries" motor bar 105 has two separate and distinct functions in this machine—one, to release the machine when the item totals of the various transactions are made, except "Paid Out" transactions; and for straight adding operations it is operated to release the machine to cause the selection of the "Groceries" totalizer, so that the amount of the "Groceries" can be totaled.

While the form of mechanism herein shown and described is admirably adapted to fulfill the objects primarily stated, it is to be understood that it is not intended to confine the invention to the particular form of embodiment herein disclosed.

What is claimed is:

1. In a machine capable of registering single and multiple-item transactions and totals of such transactions; machine releasing means; a plurality of depressible keys adapted to cause operation of said releasing means; a motor bar adapted to cause operation of said releasing means; a total control means; devices operable by a certain one of said keys to prevent operation of the remaining keys when the said certain key is operated following an operation of said total control means; differential mechanism controlled by said keys; and means held normally ineffective by the differential mechanism but rendered effective upon operation of said differential mechanism to lock said devices in effective position and to so retain said devices until the total control means is operated following an operation effected by depression of said one key.

2. In a machine capable of registering single and multiple item transactions and totals of such transactions; machine releasing means; a plurality of depressible keys adapted to cause operation of said releasing means; a motor bar adapted to cause operation of said releasing means; a total control means; a slidable member operated by one of said keys to block operation of the remaining keys; a control member operable under control of said one key; and means operable by the control member to prevent operation of the machine releasing means upon operation of said motor bar at the end of the operation of the machine, which is initiated by said one key.

3. In a machine capable of registering single and multiple item transactions and totals of such transactions; machine releasing means; a plurality of depressible keys adapted to cause operation of said releasing means; a motor bar adapted to cause operation of said releasing means; a total control means; a slidable member operated by one of said keys to block operation of the remaining keys; a control member; means operable by the control member to prevent operation of the machine releasing means upon operation of said motor bar at the end of the operation of the machine, which is initiated by said one key; and means intermediate the slide member and the control member to operate the latter at the end of the operation which is initiated by said one key.

4. In a machine capable of registering single and multiple item transactions and totals of such transactions; machine releasing means; a plurality of depressible keys adapted to cause operation of said releasing means; a motor bar adapted to cause operation of said releasing means; a total control means; a slidable member operated by one of said keys to block operation of the remaining keys; a control member operable under control of said one key; means operable by the control member to prevent operation of the machine releasing means upon operation of said motor bar at the end of the operation of the machine which is initiated by said one key; means to lock the slidable member in operated position; and means operable under control of the total control means when the latter is moved into a certain position to restore said locking means to normal to unlock the slidable member.

5. In a machine capable of registering single and multiple item transactions and totals of such transactions; machine releasing means; a plurality of depressible keys adapted to cause operation of said releasing means; a motor bar adapted to cause operation of said releasing means; a total control means; a slidable member operated by one of said keys to block operation of the remaining keys; a control member operable under control of said one key; means operable by the control member to prevent operation of the machine releasing means upon operation of said motor bar at the end of the operation of the machine, which is initiated by said one key; means to lock the slidable member in operated position; means operable under control of the total control means when the latter is moved into a certain position to restore said locking means to normal to unlock the slidable member; and means to move the slidable member to normal position when it is unlocked, and simultaneously cause the slidable member to restore the control member to normal to unlock the machine releasing means.

6. In a machine capable of registering single and multiple item transactions and totals of such transactions; machine releasing means; a plurality of depressible keys adapted to cause operation of said releasing means; a motor bar adapted to cause operation of said releasing means; a total control means; differential mechanism controlled by said keys; a slidable member operated by one of said keys to block operation of the remaining keys; a control member; means intermediate the slidable member and the control member to operate said control member; means operable by the control member to prevent operation of the machine releasing means upon operation of said motor bar at the end of the operation of the machine which is initiated by said one key; and means held normally ineffective by the differential mechanism but rendered effective upon operation of said differential mechanism to lock the slidable member in blocking position whereupon said intermediate means causes the control member to remain in its blocking position until the total control means is operated following an operation effected by depression of said one key.

7. In a machine of registering single and multiple item transactions, and totals of such transactions; machine releasing means; a plurality of depressible keys adapted to cause operation of said releasing means; a motor bar adapted to cause operation of said releasing means; a total control means; differential mechanism controlled by said keys; devices operable by a certain one of said keys to prevent said motor bar from causing operation of said releasing means when said certain key is operated following an operation of said total control means; and means controlled by the differential mechanism for causing said devices to be retained in operated position until an operation of the machine is initiated by said one key with the total control means in a certain position.

8. In a machine capable of registering single and multiple item transactions and totals of such transactions; machine releasing means; a plurality of depressible keys adapted to cause operation of said releasing means; a motor bar adapted to cause operation of said releasing means; a slidable member operated by one of said keys to block operation of the remaining keys; a control member; resilient means connecting the control member to the slidable member to operate the control member upon operation of the slidable member and means operable by the control member to prevent operation of the machine releasing means by said motor bar for an immediate operation after the completion of an operation which had been initiated by said one key.

9. In a machine capable of registering single and multiple item transactions and totals of such transactions; machine releasing means; a plurality of depressible keys adapted to cause operation of said releasing means; a motor bar adapted to cause operation of said releasing means; a total control means; a slidable member controlled by one of said keys to block operation of the remaining keys; a control member carrying said slidable member and operable under control of said one key; an arm carried by the machine releasing means; and means operable by the control member and cooperating with said arm to prevent operation of the machine releasing means by said motor bar immediately after the completion of an operation which had been initiated by said one key.

10. In a machine capable of registering single and multiple item transactions and totals of such transactions; machine releasing means; a plurality of depressible keys adapted to cause operation of said releasing means; a motor bar adapted to cause operation of said releasing means; a total control means; a slidable member controlled by one of said keys to block operation of the remaining keys; a control member carrying said slidable member and operable under control of said one key; an arm carried by the machine releasing means; means operable by the control member and cooperating with said arm to prevent operation of the machine releasing means by said motor bar immediately after the completion of an operation which had been initiated by said one key; and means controlled by the total control means and said one key when performing an item total operation initiated by said one key to cause the slidable member to unblock the said remaining keys and restore the means operable by the control member to normal position.

(References on following page)

References Cited in the file of this patent

UNITED STATES PATENTS

| Number | Name | Date |
|---|---|---|
| 1,808,398 | Brand | June 2, 1931 |
| 1,840,535 | Shipley | Jan. 12, 1932 |
| 2,101,636 | Breitling et al. | Dec. 7, 1937 |
| 2,239,807 | Breitling et al. | Apr. 29, 1941 |
| 2,616,623 | Goodbar et al. | Nov. 4, 1952 |